United States Patent [19]
Luke et al.

[11] 4,167,769
[45] Sep. 11, 1979

[54] PANELBOARD HAVING DISTRIBUTED NEUTRAL

[75] Inventors: Roger D. Luke, Norcross; John M. Rhodes, Atlanta, both of Ga.

[73] Assignee: Gould Inc., Rolling Meadows, Ill.

[21] Appl. No.: 920,154

[22] Filed: Jun. 29, 1978

[51] Int. Cl.² ............................................. H02B 1/04
[52] U.S. Cl. .................... 361/355; 361/361; 339/198 N
[58] Field of Search .............. 339/198 N; 361/346, 361/353, 355, 358, 361, 363

[56] References Cited
U.S. PATENT DOCUMENTS 4,079,439  3/1978  Coles ........................ 339/198 N
4,118,754  10/1978  Duggan ........................ 361/355

Primary Examiner—Gerald P. Tolin
Attorney, Agent, or Firm—Ostrolenk, Faber, Gerb & Soffen

[57] ABSTRACT

A panelboard is constructed with a line terminal array in a row midway between mechanical parallel elongated support means for the circuit breaker load ends. Disposed outboard of and extending parallel to each support means is an elongated neutral bar having a plurality of load wire grips thereon. Main lugs for energizing the line terminal array are disposed at one end thereof, and at the other end thereof a connecting bar extends between the neutral bars for an electrical interconnection therebetween.

6 Claims, 7 Drawing Figures

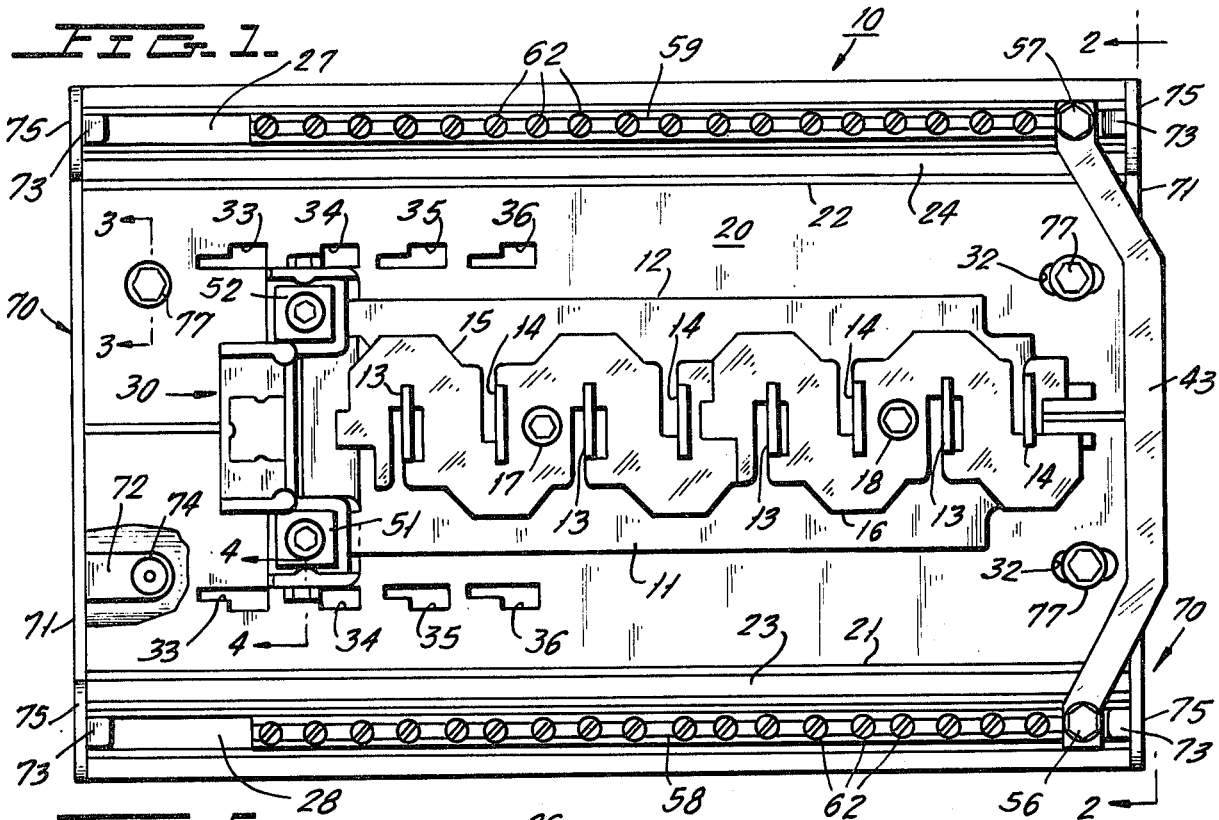
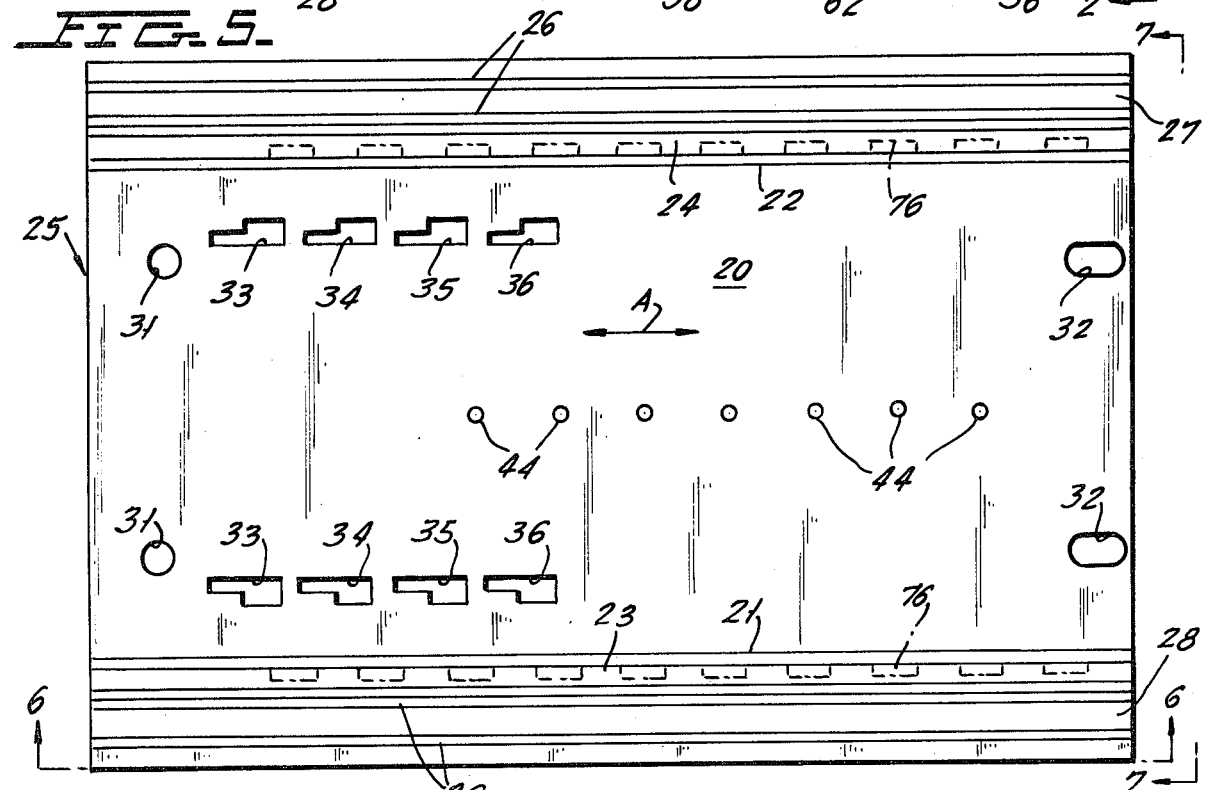
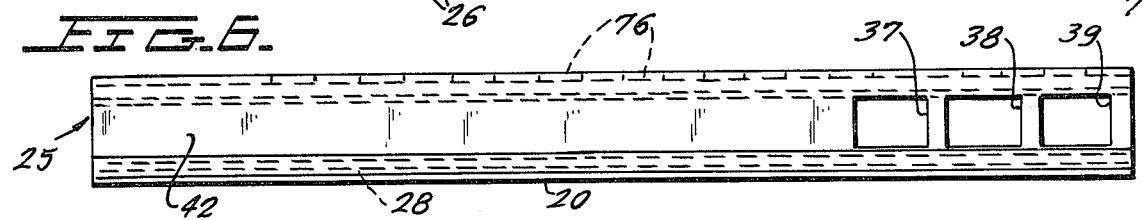

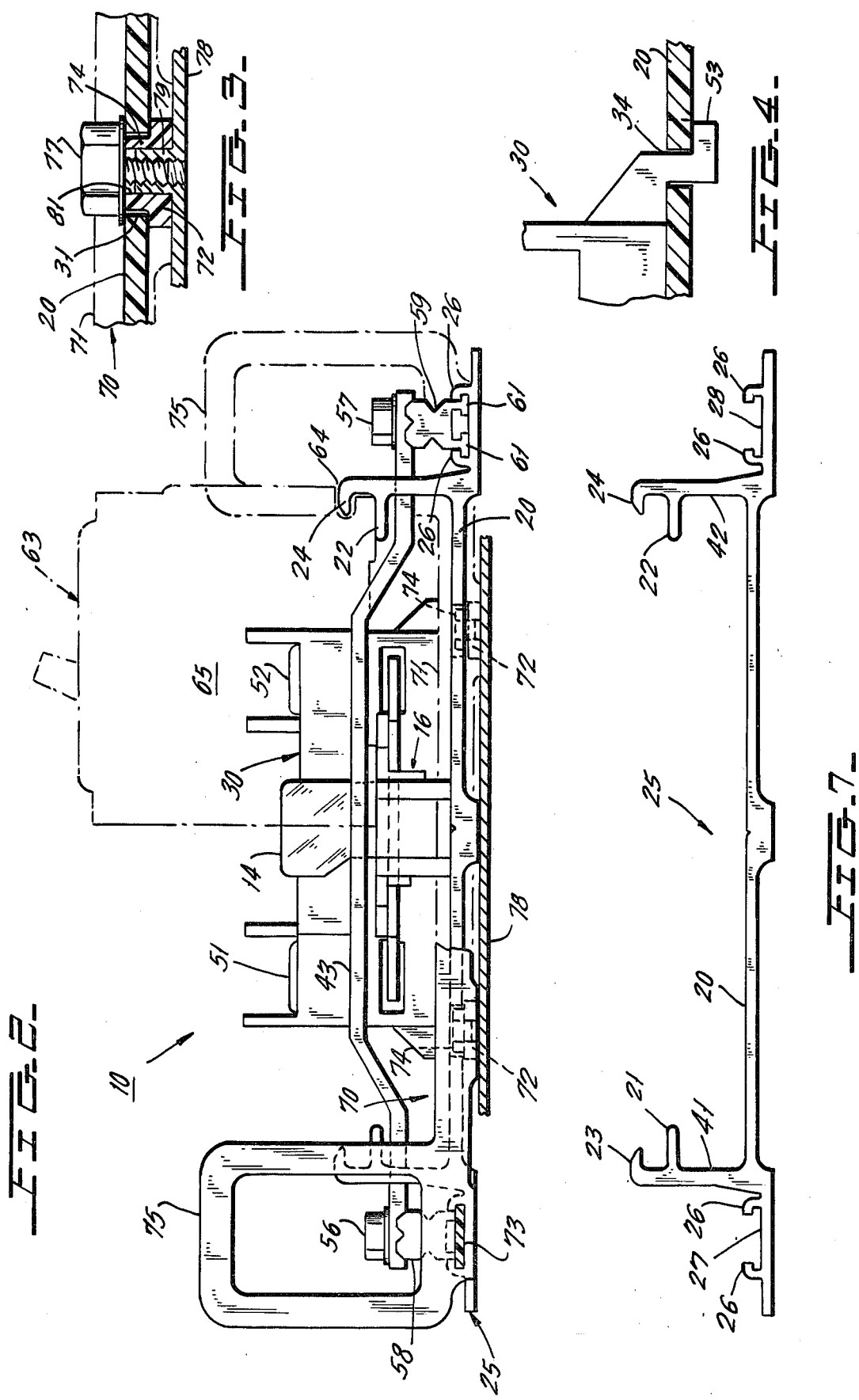

PANELBOARD HAVING DISTRIBUTED NEUTRAL

This invention relates to devices for the distribution of electrical power and more particularly relates to panelboards for home and light industrial applications.

Single phase panelboards of the type commonly used in the home are energized by two hot lines having a potential difference of 230 volts therebetween, and a neutral which is at a potential difference of 115 volts with respect to each of the hot wires. In typical panelboards the neutral bars are usually positioned so that the neutral connections are remote from the load ends of the panelboard circuit breakers. This results in the need to strip extensive lengths of insulation from branch wires, the wiring gutters become cluttered, and checking continuity of branch circuits becomes difficult.

To alleviate the foregoing problems, the prior art, as exemplified by U.S. Pat. No. 4,020,400 issued Apr. 26, 1977 to G. F. Hawkes, Jr., for An Intergrated Circuit Breaker Panelboard, provided a circuit breaker having a line terminal at one end and both load and neutral terminals at the other end. The neutral terminal was connected to an elongated neutral bar either by a plug-in or bolted connection.

Thus, in order to carry out the teachings of the aforesaid U.S. Pat. No. 4,020,400 it is necessary to provide a special circuit breaker having a neutral connector at the load end. As a practical matter, this is not readily accomplished especially in residential single pole breakers where space at the load end is usually at a premium.

Pursuant to the instant invention, a panelboard construction is provided to utilize prior art circuit breakers and include a neutral distributed so that connections thereto are made adjacent to the load ends of the respective circuit breakers. This is accomplished by utilizing elongated neutral bars disposed adjacent to and outboard of the mounting formations of the panelboard which support the circuit breakers at their load ends. The line contact array of the panelboard is disposed halfway between parallel mounting formations and extends parallel thereto. Main lugs for energizing the line contact array are disposed at one end thereof. A neutral connecting bar disposed at the other end of the line contact array is connected at its opposite ends to the respective neutral bar to provide an electrical connection therebetween.

Accordingly, a primary object of the instant invention is to provide a novel panelboard having a distributed neutral.

Another object is to provide a panelboard of this type which utilizes conventional circuit breakers having only line and load terminals.

Still another object is to provide a panelboard of this type in which the distributed neutral includes elongated bars having a plurality of wire gripping elements.

A further object is to provide a panelboard of this type having simplified means for securing the neutral bars and providing electrical connections therebetween.

These objects as well as other objects of this invention shall become readily apparent after reading the following description of the accompanying drawings in which:

FIG. 1 is a plan view of an electrical panel embodying the instant invention.

FIG. 2 is an end view looking in the direction of arrows 2—2 of FIG. 1.

FIGS. 3 and 4 are fragmentary cross-sections taken through the respective lines 3—3 and 4—4 of FIG. 1 looking in the directions of the respective arrows 3—3 and 4—4.

FIG. 5 is a plan view of the extruded insulating member which includes the base of the electrical panel.

FIGS. 6 and 7 are elevations of the extruded member of FIG. 5 looking in the directions of the respective arrows 6—6 and 7—7 of FIG. 5.

Now referring to the Figures. Electric distribution panel indicated generally by reference numeral 10 in FIG. 1 includes main bus bars 11, 12 having a plurality of integrally formed male stabs or line contact blades 13, 14, respectively. Insulators 15, 16 maintain clearances between bus bars 11, 12 and their respective blades 13, 14 in a manner fully described in U.S. Pat. No. 3,349,292 issued Oct. 24, 1967 to J. F. Meacham for a Load Center. Screws 17, 18 extend through insulators 15, 16 to secure bus bars 11, 12 to base 20.

The latter is the main plate-like portion of extruded insulating member 25 shown in detail in FIGS. 5-7. A suitable material for extrusion 25 is the plastic insulating material manufactured by the General Electric Company using the trademark NORYL. Extrusion 25 also includes a pair of elongated ledges 21, 22 positioned in front of base 20, a pair of mounting hooks 23, 24 mounted in front of the respective ledges 21, 22, and elongated channels 27, 28 disposed outboard of the respective hook formations 23, 24. Channels 27, 28 are very shallow and the fronts thereof are generally open, having short inwardly extending lips at the front thereof. As operations secondary to the extrusion in a direction parallel to the double headed arrow A in FIG. 5, extruded member 25 is provided with a pair of circular apertures 31 at one end thereof and a pair of elongated apertures 32 at the other end thereof for a reason which will hereinafter be seen. Four pairs of L-shaped slots 33, 34, 35, 36 are punched in base 20 for positioning main lug insulator 30 (FIG. 1) in a manner which will be described hereinafter. Three pair of rectangular apertures 37, 38, 39 (FIG. 6) are punched through each of the connecting portions 41, 42 between base 20 and the respective ledges 21, 22 for operative positioning of transverse neutral connecting bar 43, for a reason which will hereinafter be explained. Centrally located apertures 44 in base 20 are provided to receive bus bar insulator mounting screws such as 17, 18.

As seen best in FIGS. 1 and 2, line terminal stabs or contacts 13, 14 are face-to-face in a row-like array extending parallel to extrusion direction A and positioned midway between ledges 21, 22. The left ends of bus bars 11, 12, as viewed in FIG. 1, extend through clearance apertures in block 30 and are connected to the respective main terminal lug 51, 52 disposed within appropriate recesses of block 30, with the left ends of bus bars 11, 12 being adjacent to the respective lips 91, 92 of block 30 which position the respective lugs 51, 52. Block 30 is mounted to base 20 by moving outwardly extending feet 53 thereof (FIG. 4) rearward through the enlarged portions of slots 34, 34, and thereafter sliding block 30 to the left with respect to FIG. 1 so that feet 53 are captured behind portions of base 20 (FIG. 4). Now base 20 blocks forward and rearward movement of block 30 and also prevents movement thereof to the left with respect to FIG. 1. The connections between lugs 51, 52 and bus bars 11, 12 prevent movement of block 30 to the right with respect to FIG. 1.

Connecting bar 43 is a rigid conducting member having a main central section and rearwardly offset ends which are connected by screws 56, 57 to the respective neutral bars 58, 59. The latter are mounted in channels 27, 28 being captured therein by lips 26 which are positioned in front of outward protrusions 61 at the rear of each of the neutral bars 58, 59. The ends of connecting bar 43 extend through aligned apertures 39, 39 so that connecting portions 41, 42 of extrusion 25 prevent movement of connecting bar 43 and neutral bars 58, 59 connected thereto to both the left and right with respect to FIG. 1. In a manner well known to the art each neutral bar 58, 59 is provided with a plurality of apertures for receiving wires and each of these apertures has entered therein a wire gripping screw 62 to retain the wire (not shown) connected to the neutral bar 58, 59. It is noted that each of the neutral bars 58, 59 extends parallel to the extrusion direction A and there are sufficient wire receiving apertures so that a neutral connection may be made in the close vicinity of the load connection to a particular circuit breaker 63 mounted to device 10. A neutral lug (not shown) may be mounted on one of the neutral bars 58, 59. Circuit breaker 63 does not form any part of the instant invention but is merely of a type well known to the art which is shown in FIG. 2 as having its load end supported on ledge 22 and being retained by hook formation 24 which extends into transverse slot 64 which extends the full width of circuit breaker housing 65. For the utilization of circuit breakers which do not have hook receiving recesses open at both ends, as a secondary operation portions, such as those indicated by reference numeral 76 and shown in phantom in FIGS. 5 and 6, are cut from hook means 23, 24 to form a plurality of discrete relatively narrow hooks. In a manner well known to the art the lower left portion of circuit breaker 63 shown in FIG. 2 is provided with a female line terminal which frictionally engages one of the contacts in the array 13, 14.

Mounted to the ends of extruded member 25 are identical wire guide elements 70 each constructed of insulating material. Element 70 includes connecting rod 71 having a pair of tabs 72 extending transversely therefrom in the extrusion direction A. Disposed outboard of tab 72 are a pair of ears 73 which extend into the ends of channel 27, 28. Tabs 72 extend behind base 20 and forward embossments 74 on tabs 72 near the free ends thereof, extend through either base apertures 31 or 32 depending upon which end of base 20 the particular guide element 70 is mounted. Rectangular formations at the ends of rod 71 form post 75 which are aligned with neutral bars 58, 59 extending considerably more forward than mounting hooks 23, 24. In a manner well known to the art the four posts 75 define areas through which wires are not to be run.

The diameter of each base aperture 31 is only slightly greater than the diameter of embossment 74 (FIG. 3). In order to mount panel 10 to a support, such as the rear wall 78 of an enclosure (not shown), panel 10 is located on wall 78 by four extrusions 79 each of which extends forward from wall 78 into an individual aperture 81. The latter extends through tab 72 and is centrally located with respect to embossment 74. Extrusion 79 is provided with a threaded central aperture which receives the threaded portion of shoulder screw 77 whose head abuts base 20. The cooperation of annular embossments 74 disposed within elongated base apertures 32 permits substantial differential expansion and contraction of base 20 relative to mounting wall 78 without buckling of base 20 or unduly straining.

As seen best in FIG. 7, the sections of extrusion 25 are relatively thin so that extrusion 25 is per se relatively flexible. However, the overall panel structure 10 possesses sufficient rigidity for its intended purpose in that there are a sufficient number of relatively rigid metallic elements connected either directly or indirectly to extrusion 25. These metallic elements include neutral bars 58, 59, connecting bar 43, and main bus bars 11, 12. Molded block 30 and molded insulators 15, 16 also lend rigidity to the overall panel structure 10. The latter is further rigidified by securement to wall 78.

Utilization of extrusion techniques permits the utilization of the same dies for constructing many different size panels. That is, the extrusion cross-section of FIG. 7 is retained for many size panels. The length of the extrusion is determined by the number of circuit breaker locations desired. The number of circuit breaker locations also determines the lengths of the neutral bars and bus bars, and also determines the locations of the main terminal mounting block and the connecting bar secured to the neutral bars.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. An electrical power distribution device including a base, first and second parallel elongated neutral bars mounted to said base, first and second elongated mounting formations on said base for supporting load ends of circuit breakers when the latter are mounted to said device, said first and second mounting formations being in the vicinity of the respective first and second neutral bars and being positioned inboard thereof, a line contact array disposed between said mounting formations to be electrically engaged with circuit breakers when the latter are mounted to said device, an electrical conductor disposed at one end of said array and having its opposite ends secured to said first and second neutral bars to provide an electrical connection therebetween.

2. An electrical power distribution device as set forth in claim 1 also including main lugs connected to the array at the other end thereof.

3. An electrical power distribution device as set forth in claim 1 in which holding formations on the base position the neutral bars transverse to their longitudinal axes; a connecting bar constituting said electrical conductor said mounting formations having apertures through which the connecting bar extends; said apertures being disposed and proportioned to block movement of the connecting bar parallel to said axes to thereby prevent movement of said neutral bars parallel to said axes.

4. An electrical power distribution device as set forth in claim 3 also including main lugs connected to the array at the other end thereof.

5. An electrical power distribution device as set forth in claim 3 in which the neutral bars include complementary formations which interlock with the holding formations for sliding engagement of the latter with the neutral bars.

6. An electrical power distribution device as set forth in claim 3 also including main lugs connected to the array at the other end thereof.

* * * * *

REEXAMINATION CERTIFICATE (1592nd)

United States Patent [19]

Luke et al.

[11] B1 4,167,769

[45] Certificate Issued Nov. 26, 1991

[54] PANELBOARD HAVING DISTRIBUTED NEUTRAL

[75] Inventors: Roger D. Luke, Norcross; John M. Rhodes, Atlanta, both of Ga.

[73] Assignee: Siemens-Allis, Inc.

Reexamination Request
No. 90/002,069, Jun. 25, 1990
No. 90/002,132, Sep. 10, 1990

Reexamination Certificate for:
Patent No.: 4,167,769
Issued: Sep. 11, 1979
Appl. No.: 920,154
Filed: Jun. 29, 1978

[51] Int. Cl.⁵ .......................................... H02B 1/04
[52] U.S. Cl. .................................. 361/355; 361/361; 439/507; 439/724
[58] Field of Search ........ 361/241, 342, 346, 353–355, 361/361, 363, 376; 439/709, 712, 715, 716, 724, 507

[56] References Cited

U.S. PATENT DOCUMENTS

| | | | |
|---|---|---|---|
| 1,782,019 | 11/1930 | Wheeler | 361/359 |
| 1,914,074 | 6/1933 | Bruijnes et al. | |
| 2,131,884 | 4/1938 | Brodhecker | 173/343 |
| 2,170,299 | 8/1939 | Frank | 173/324.1 |
| 2,192,899 | 3/1940 | Edmonson | 173/324.1 |
| 2,332,766 | 10/1943 | von Gehr | 191/12 |
| 2,466,566 | 4/1949 | Tiscione | 173/358 |
| 2,511,995 | 6/1950 | Robertson et al. | 173/342 |
| 2,738,445 | 3/1956 | Hammerly et al. | 317/119 |
| 2,767,353 | 10/1956 | Kingdon | 317/119 |
| 2,862,995 | 12/1958 | Hercules | 174/99 |
| 2,902,632 | 9/1959 | Stanback et al. | 317/119 |
| 2,905,796 | 9/1959 | Fleming | 200/168 |
| 2,924,804 | 2/1960 | Frank et al. | 339/21 |
| 2,934,660 | 4/1960 | Brunner | 307/147 |
| 2,934,660 | 6/1957 | Brunner | 307/147 |
| 2,980,824 | 4/1961 | Kobryner | 317/116 |
| 2,986,676 | 5/1961 | Edmunds | 317/119 |
| 3,119,051 | 1/1964 | Norden | 317/119 |
| 3,164,752 | 1/1965 | Koenig | 317/119 |
| 3,166,633 | 1/1965 | Guzan, Jr. et al. | 174/101 |
| 3,202,881 | 8/1965 | Carlyle | 317/119 |
| 3,243,663 | 3/1966 | Rowe | 317/119 |
| 3,278,807 | 10/1966 | Galante et al. | 317/119 |
| 3,278,807 | 8/1967 | Galante | 317/119 |
| 3,309,580 | 3/1967 | Jacobs et al. | 317/119 |
| 3,333,157 | 7/1967 | Stokes | 317/119 |
| 3,346,776 | 10/1967 | Olashaw | 317/117 |
| 3,349,292 | 10/1967 | Meacham | 317/120 |
| 3,356,907 | 12/1967 | Bragulat | 317/120 |
| 3,367,809 | 2/1968 | Soloff | 156/73 |
| 3,375,411 | 3/1968 | Mrowka | 317/119 |
| 3,404,315 | 10/1968 | Jacobs et al. | 317/119 |
| 3,411,042 | 11/1968 | Klein | 317/119 |
| 3,418,536 | 12/1968 | Jacobs et al. | 317/119 |
| 3,463,967 | 8/1969 | Klein | 317/119 |
| 3,516,049 | 6/1970 | Goodridge | 339/242 |
| 3,532,938 | 10/1970 | Holman et al. | 317/119 |
| 3,588,620 | 6/1971 | Wasileski | 317/119 |
| 3,594,710 | 7/1971 | Stanback | 339/198 |
| 3,727,171 | 4/1973 | Coles et al. | 339/22 B |
| 3,767,977 | 10/1973 | Bachman | 317/119 |
| 3,769,553 | 10/1973 | Coley | 317/119 |
| 3,801,875 | 4/1974 | Morby et al. | 317/120 |
| 3,855,504 | 12/1974 | Olashaw | 317/120 |
| 3,858,092 | 12/1974 | Olashar et al. | 317/120 |
| 3,873,759 | 3/1975 | Schindler et al. | 174/65 R |
| 3,924,161 | 12/1975 | Olashaw et al. | 317/120 |
| 4,002,388 | 1/1977 | Menocal | 339/22 B |
| 4,020,400 | 4/1977 | Hawkes, Jr. et al. | 361/353 |
| 4,137,424 | 1/1979 | Hessee et al. | 174/97 |
| 4,142,225 | 2/1979 | Diersing et al. | 361/358 |
| 4,153,318 | 5/1979 | Bishop et al. | 339/22 B |
| 4,167,768 | 9/1979 | Baker | 361/355 |
| 4,188,754 | 10/1978 | Duggan | 361/355 |
| 4,251,851 | 2/1981 | Diersing et al. | 361/363 |

FOREIGN PATENT DOCUMENTS

| | | | |
|---|---|---|---|
| 1010545 | 9/1923 | Canada | 347/23 |
| 675591 | 12/1963 | Canada | 317/119 |
| 679272 | 2/1964 | Canada | 317/119 |
| 805270 | 1/1969 | Canada | 317/119 |
| 862925 | 2/1971 | Canada | 347/12 |
| 1513380 | 2/1968 | France | |
| 1304686 | 4/1969 | United Kingdom | 339/174 |

OTHER PUBLICATIONS

I-T-E Electrostrip Multi-Outlet Assembly, Gould Speedfox Catalog, (Oct. 1977) p. 110.
Arrow-Hart 1969 product catalog of Arrow-Hart & Hegeman Electric Co.
Underwriters' Laboratory Electrical Report No. 11067, vol. II, Sec. 4, issued Apr. 18, 1960.
Murray 1962 product catalog of Murray Manufacturing Corporation.
Murray 1969 product catalog of Murray Manufacturing Corporation.
Underwriters' Laboratories, Inc. Electrical Report No. 26095, dated Jan. 13, 1960.
Underwriters' Laboratory Electrical Report No. 26095, vol. I, Sec. 7, issued Sep. 21, 1959.
Underwriters' Laboratory Electrical Report No. 11067, vol. II, Sec. 2, issued Jun. 25, 1957.

Primary Examiner—Gerald P. Tolin

[57] ABSTRACT

A panelboard is constructed with a line terminal array in a row midway between mechanical parallel elongated support means for the circuit breaker load ends. Disposed outboard of and extending parallel to each support means is an elongated neutral bar having a plurality of load wire grips thereon. Main lugs for energizing the line terminal array are disposed at one end thereof, and at the other end thereof a connecting bar extends between the neutral bars for an electrical interconnection therebetween.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 3 are determined to be patentable as amended.

Claims 2 and 4–6, dependent on an amended claim, are determined to be patentable.

1. An electrical power distribution device including a base, first and second parallel elongated neutral bars mounted to said base, first and second elongated mounting formations on said base for supporting load ends of circuit breakers when the latter are mounted to said device, said first and second mounting formations being in the vicinity of the respective first and second neutral bars and being positioned inboard thereof, [a line contact array] *first and second main busses having a plurality of circuit breaker engageable stab portions* disposed between said *first and second* mounting formations, *said stab* portions to be electrically engaged with circuit breakers when the latter are mounted to said device, an electrical conductor disposed at one end of said array and having its opposite ends secured to said first and second neutral bars to provide an electrical connection therebetween.

3. An electrical power distribution device *including a base, first and second parallel elongated neutral bars mounted to said base; first and second elongated mounting formations on said base for supporting load ends of circuit breakers when the latter are mounted to said device, said first and second mounting formations being in the vicinity of the respective first and second neutral bars and being positioned inboard thereof; a line contact array disposed between said mounting formations to be electrically engaged with circuit breakers when the latter are mounted to said device; a connecting bar constituting an electrical conductor disposed at one end of said array and having its opposite ends secured to said first and second neutral bars to provide an electrical connection therebetween;* [as et forth in claim 1 in which] holding formations on the base [position] *for positioning* the neutral bars transverse to their longitudinal axes; [a connecting bar constituting said electrical conductor] *and* said mounting formations having apertures through which the connecting bar extends[;] , said apertures being disposed and proportioned to block movement of the connecting bar parallel to said axes [to] thereby *to* prevent movement of said neutral bars parallel to said axes.

* * * * *